(12) United States Patent
Abotabl et al.

(10) Patent No.: US 12,500,444 B2
(45) Date of Patent: Dec. 16, 2025

(54) ENERGY HARVESTING REPORTING

(71) Applicant: QUALCOMM Incorporated, San Diego, CA (US)

(72) Inventors: Ahmed Attia Abotabl, San Diego, CA (US); Ahmed Elshafie, San Diego, CA (US); Muhammad Sayed Khairy Abdelghaffar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/451,480

(22) Filed: Oct. 19, 2021

(65) Prior Publication Data

US 2023/0117363 A1  Apr. 20, 2023

(51) Int. Cl.
  *H02J 50/00* (2016.01)
  *H04L 1/1812* (2023.01)
  *H04L 5/00* (2006.01)
  *H04W 72/23* (2023.01)

(52) U.S. Cl.
  CPC .......... *H02J 50/001* (2020.01); *H04L 1/1812* (2013.01); *H04L 5/0048* (2013.01); *H04L 5/0055* (2013.01); *H04W 72/23* (2023.01)

(58) Field of Classification Search
  CPC .......... H02J 50/001; H02J 50/80; H02J 50/00; H04W 72/23; H04W 4/00; H04W 52/00
  See application file for complete search history.

(56) References Cited

U.S. PATENT DOCUMENTS

| | | | | |
|---|---|---|---|---|
| 8,031,643 B2* | 10/2011 | Kwak | ................... | H04L 1/1607 370/278 |
| 8,068,511 B2* | 11/2011 | Reznik | ................... | H04L 1/1671 370/462 |
| 2008/0084844 A1* | 4/2008 | Reznik | .............. | H04W 72/0453 370/330 |
| 2010/0322177 A1* | 12/2010 | Luo | .......................... | H04L 1/189 370/329 |
| 2012/0213261 A1* | 8/2012 | Sayana | ................. | H04L 5/0094 375/224 |

(Continued)

FOREIGN PATENT DOCUMENTS

| | | |
|---|---|---|
| EP | 3927062 A1 | 12/2021 |
| WO | 2020164437 A1 | 8/2020 |

(Continued)

OTHER PUBLICATIONS

International Search Report and Written Opinion—PCT/US2022/078010—ISA/EPO—Feb. 22, 2023.

*Primary Examiner* — Rexford N Barnie
*Assistant Examiner* — Joseph N Inge
(74) *Attorney, Agent, or Firm* — Guang Y. Zhang; Harrity & Harrity, LLP

(57) ABSTRACT

Various aspects of the present disclosure generally relate to wireless communication. In some aspects, a user equipment (UE) may receive downlink control information (DCI) scheduling a downlink transmission. The UE may perform energy harvesting using the downlink transmission. The UE may transmit a hybrid automatic repeat request (HARQ) negative-acknowledgment (HARQ-NACK) based at least in part on using the downlink transmission for the energy harvesting. Numerous other aspects are described.

30 Claims, 9 Drawing Sheets

(56) References Cited

U.S. PATENT DOCUMENTS

| | | | | |
|---|---|---|---|---|
| 2013/0342323 | A1* | 12/2013 | Hinman | G06K 7/10287 |
| | | | | 340/10.1 |
| 2017/0041915 | A1* | 2/2017 | Gupta | H04W 72/51 |
| 2018/0092078 | A1* | 3/2018 | Fang | H04B 7/022 |
| 2020/0221325 | A1* | 7/2020 | Zheng | H04W 28/00 |
| 2021/0112499 | A1* | 4/2021 | Takeda | H04W 52/247 |
| 2022/0225402 | A1* | 7/2022 | Elkotby | H02J 50/001 |
| 2022/0393781 | A1* | 12/2022 | Kim | G06N 3/08 |
| 2023/0076409 | A1* | 3/2023 | Elkotby | H02J 50/001 |

FOREIGN PATENT DOCUMENTS

| | | | |
|---|---|---|---|
| WO | 2021112360 | A1 | 6/2021 |
| WO | 2021155209 | A1 | 8/2021 |

\* cited by examiner

ENERGY HARVESTING REPORTING

FIELD OF THE DISCLOSURE

Aspects of the present disclosure generally relate to wireless communication and to techniques and apparatuses for energy harvesting reporting.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving downlink control information (DCI) scheduling a downlink transmission. The method may include performing energy harvesting using the downlink transmission. The method may include transmitting a hybrid automatic repeat request (HARQ) negative-acknowledgment (HARQ-NACK) based at least in part on using the downlink transmission for the energy harvesting.

Some aspects described herein relate to a method of wireless communication performed by a base station. The method may include transmitting DCI scheduling a downlink transmission. The method may include receiving a HARQ-NACK indicating that the downlink transmission was used for energy harvesting.

Some aspects described herein relate to a UE for wireless communication. The user equipment may include a memory and one or more processors coupled to the memory. The one or more processors may be configured to receive DCI scheduling a downlink transmission. The one or more processors may be configured to perform energy harvesting using the downlink transmission. The one or more processors may be configured to transmit a HARQ-ACK based at least in part on using the downlink transmission for the energy harvesting.

Some aspects described herein relate to a base station for wireless communication. The base station may include a memory and one or more processors coupled to the memory. The one or more processors may be configured to transmit DCI scheduling a downlink transmission. The one or more processors may be configured to receive a HARQ-ACK indicating that the downlink transmission was used for energy harvesting.

Some aspects described herein relate to a non-transitory computer-readable medium that stores a set of instructions for wireless communication by a UE. The set of instructions, when executed by one or more processors of the UE, may cause the UE to receive DCI scheduling a downlink transmission. The set of instructions, when executed by one or more processors of the UE, may cause the UE to perform energy harvesting using the downlink transmission. The set of instructions, when executed by one or more processors of the UE, may cause the UE to transmit a HARQ-ACK based at least in part on using the downlink transmission for the energy harvesting.

Some aspects described herein relate to a non-transitory computer-readable medium that stores a set of instructions for wireless communication by a base station. The set of instructions, when executed by one or more processors of the base station, may cause the base station to transmit DCI scheduling a downlink transmission. The set of instructions, when executed by one or more processors of the base station, may cause the base station to receive a HARQ-ACK indicating that the downlink transmission was used for energy harvesting.

Some aspects described herein relate to an apparatus for wireless communication. The apparatus may include means for receiving DCI scheduling a downlink transmission. The apparatus may include means for performing energy harvesting using the downlink transmission. The apparatus may include means for transmitting a HARQ-ACK based at least in part on using the downlink transmission for the energy harvesting.

Some aspects described herein relate to an apparatus for wireless communication. The apparatus may include means for transmitting DCI scheduling a downlink transmission. The apparatus may include means for receiving a HARQ-ACK indicating that the downlink transmission was used for energy harvesting.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
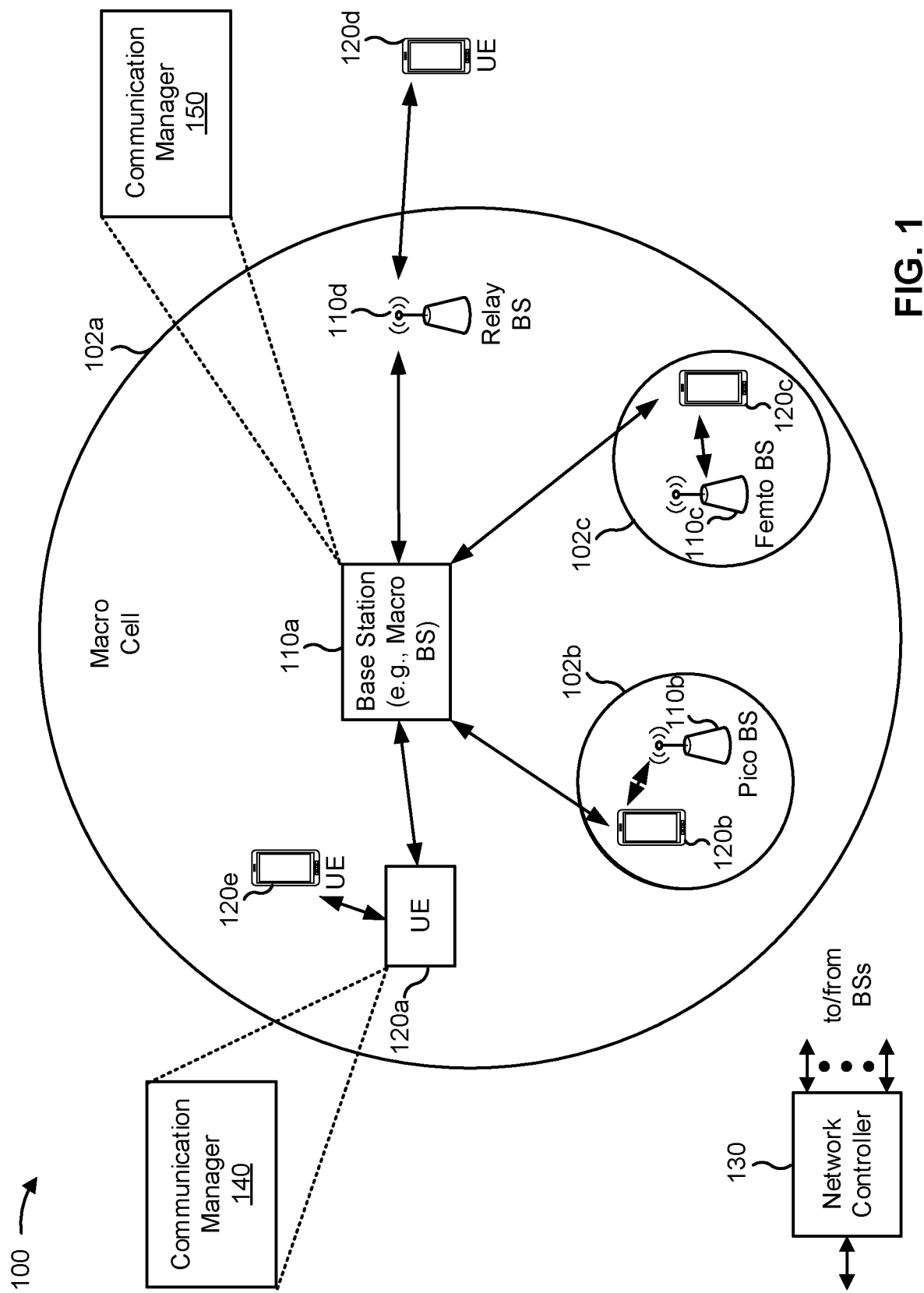
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile.

A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive DCI scheduling a downlink transmission; perform energy harvesting using the downlink transmission; and transmit a HARQ-ACK based at least in part on using the downlink transmission for the energy harvesting. Additionally, or alternatively, the communication manager 140 may perform one or more other operations described herein.

In some aspects, the base station 110 may include a communication manager 150. As described in more detail elsewhere herein, the communication manager 150 may transmit DCI scheduling a downlink transmission; and receive a HARQ-ACK indicating that the downlink transmission was used for energy harvesting. Additionally, or alternatively, the communication manager 150 may perform one or more other operations described herein.

As indicated above, FIG. 1 is provided as an example. Other examples may differ from what is described with regard to FIG. 1.

Figure 2:
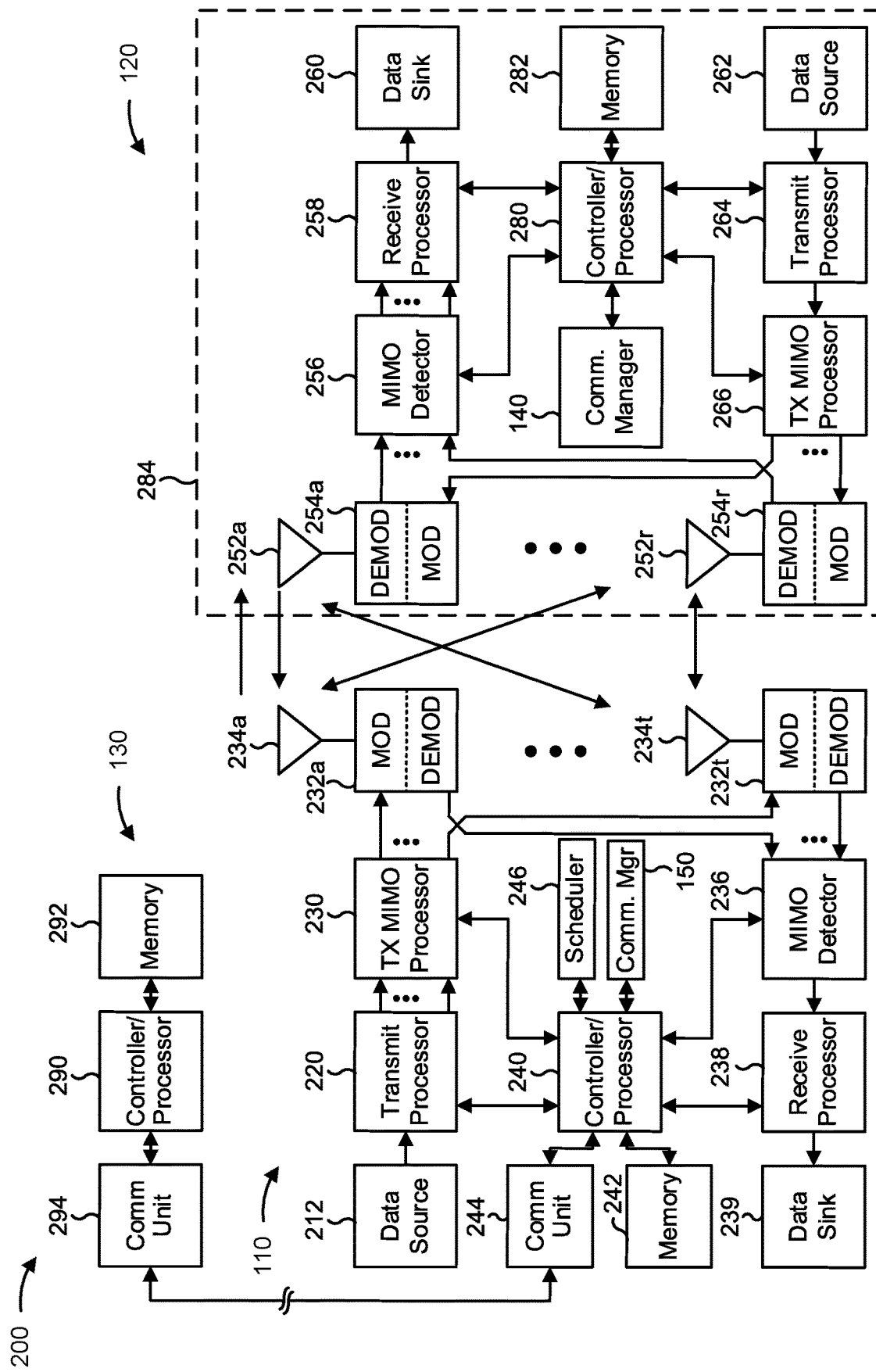
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-9).

The controller/processor 240 of the base station 110, the controller/processor 280 of the UE 120, and/or any other component(s) of FIG. 2 may perform one or more techniques associated with energy harvesting reporting, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, the UE includes means for receiving DCI scheduling a downlink transmission; means for performing energy harvesting using the downlink transmission; and/or means for transmitting a HARQ-ACK based at least in part on using the downlink transmission for the energy harvesting. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station includes means for transmitting DCI scheduling a downlink transmission; and/or means for receiving a HARQ-ACK indicating that the downlink transmission was used for energy harvesting. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
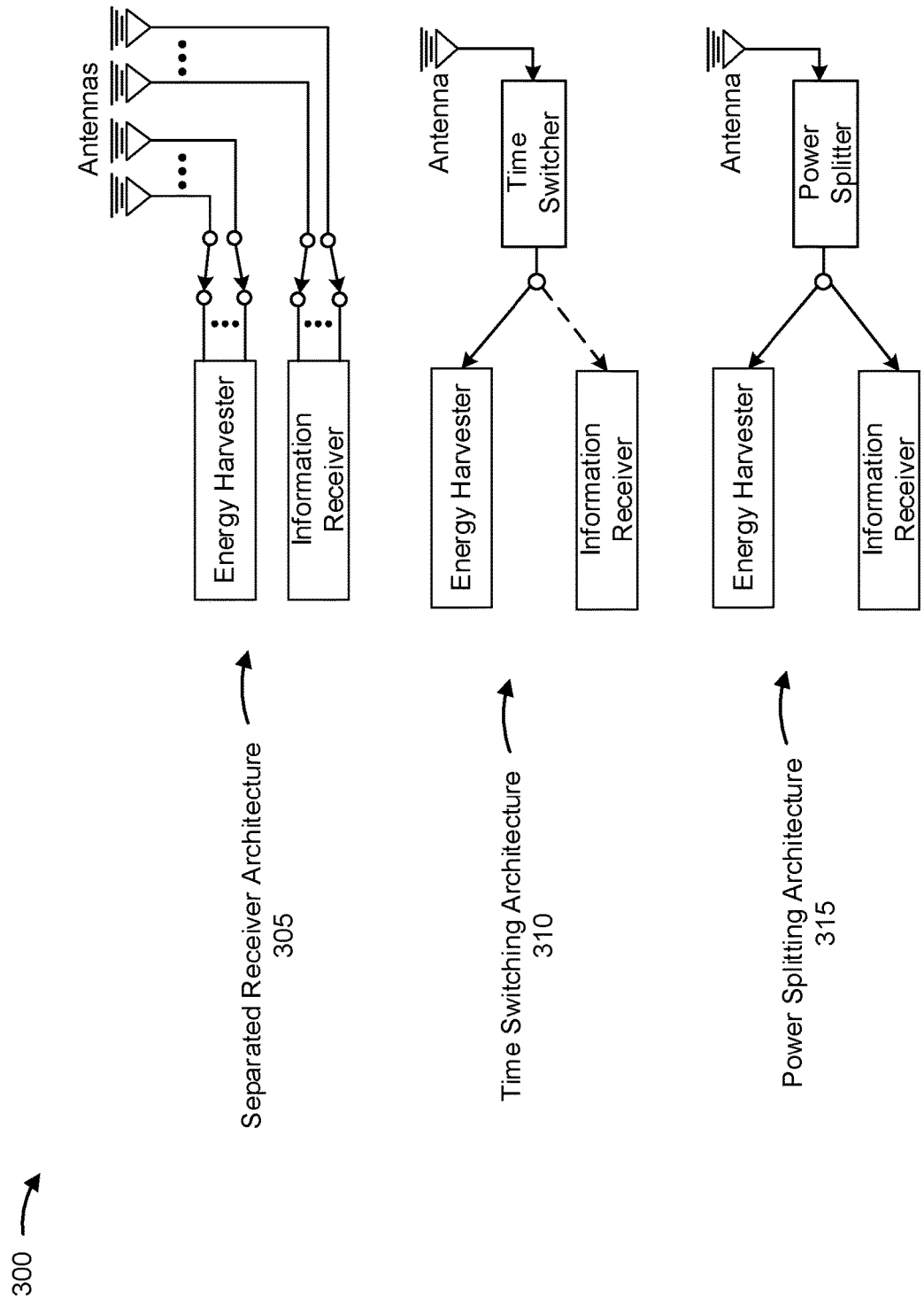
FIG. 3 is a diagram illustrating an example of radio frequency energy harvesting, in accordance with the present disclosure.

FIG. 3 is a diagram illustrating an example 300 of radio frequency (RF) power headroom reporting, in accordance with the present disclosure. As shown in FIG. 3, an RF receiver (e.g., a UE 120) may receive signals (e.g., radio signals carried on radio waves) from an RF transmitter (e.g., a base station 110 or UE 120) and convert electromagnetic energy of the signals (e.g., using a rectenna comprising a dipole antenna with an RF diode) into direct current electricity for use by the RF receiver.

As shown by reference number 305, in some aspects, the RF receiver may use a separated receiver architecture, where a first set of antennas is configured to harvest energy, and a second set of antennas is configured to receive data. In this situation, each set of antennas may be separately configured to receive signals at certain times, frequencies, and/or via one or more particular beams, such that all signals received by the first set of antennas are harvested for energy, and all signals received by the second set of antennas are processed to receive information.

As shown by reference number 310, in some aspects, the RF receiver may use a time-switching architecture to harvest energy. The time switching architecture may use one or more antennas to receive signals, and whether the signals are harvested for energy or processed to receive information depends on the time at which the signals are received. For example, one or more first time slots may be time slots during which received signals are sent to one or more energy harvesting components to harvest energy, and one or more second time slots may be time slots during which received signals are processed and decoded to receive information. In some aspects, the time slots may be pre-configured (e.g., by the RF receiver, the RF transmitter, or another device).

As shown by reference number 315, in some aspects, the RF receiver may use a power splitting architecture to harvest energy. The power splitting architecture may use one or more antennas to receive signals, and the signals are handled by one or both of the energy harvesting and/or information receiving components according to an energy harvesting rate. For example, the RF receiver may be configured to use a first portion of received signals for energy harvesting and the remaining received signals for information receiving. In some aspects, the energy harvesting rate may be pre-configured (e.g., by the RF receiver, the RF transmitter, or another device).

Energy harvested by the RF receiver may be used and/or stored for later use. For example, in some aspects, the RF receiver may be powered directly by the harvested energy. In some aspects, the RF receiver may use an energy storage device, such as a battery, capacitor, and/or supercapacitor, to gather and store harvested energy for immediate and/or later use.

As indicated above, FIG. 3 is provided as an example. Other examples may differ from what is described with respect to FIG. 3.

In some communications systems, a UE and a base station may use HARQ feedback to ensure reliability of wireless communications. For example, a base station may transmit a message, such as a DCI, on a downlink, and the UE may transmit HARQ feedback on an uplink to indicate whether the UE was successful in receiving the message (e.g., a HARQ acknowledgment (ACK)) or was unsuccessful in receiving the message (e.g., a HARQ negative acknowledgment (NACK)). In some cases, the base station may transmit messages on a downlink, such as physical downlink shared channel (PDSCH) messages, using semi-persistent scheduling (SPS). To ensure flexibility in terms of a periodicity of transmitting downlink messages, a reliability of transmitting downlink messages, and/or the like, the base station may configure a plurality of different SPS cycles. For example, the base station may configure a first SPS cycle for a first set of downlink messages and a second SPS cycle for a second set of downlink messages. Additionally, or alternatively, UE 120 may use dynamic grant (DG) scheduling for PDSCH messages, or physical downlink control channel (PDCCH) messages, and/or the like.

HARQ feedback may include an indicator of whether or not a message was successfully received (e.g., a HARQ-ACK or a HARQ-NACK), and may include additional information. Such additional information may include, for example, a log likelihood ration (LLR) output, a block error ratio (BLER), an indicator of a network characteristic (e.g., a channel quality indicator (CQI), a power offset, a power control parameter, a margin for a minimum required signal to interference and noise ratio (SINR), a modulation and coding scheme (MCS) (e.g., a delta MCS (deltaMCS) parameter identifying a change to an MCS), a preferred link (when in a multi-link communication mode), a reason for a decoding failure (when transmitting a HARQ-NACK), and/or the like), and/or the like. This additional information may provide the base station with explicit feedback, which may help the base station update communication parameters for the link between the base station and the UE more quickly than a simple indication of whether the message was successfully received or not. In one example, the base station may use the additional information to set an MCS.

In some situations, a UE may use a downlink transmission from the base station for energy harvesting. In these situations, the UE may not provide any HARQ feedback or may provide a HARQ-NACK that does not include information that enables the base station to determine why the downlink transmission failed. Without an indication of the reason the downlink transmission failed, the base station may unnecessarily alter the communication parameters in an attempt to successfully transmit to the UE. The unnecessary altering of the communication parameters may lead to a lower quality link between the base station and UE.

Some techniques and apparatuses described herein enable a UE to communicate, via HARQ feedback, that the UE has used some or all of a downlink transmission for energy harvesting. For example, the UE may receive DCI from a base station, perform energy harvesting on a downlink transmission scheduled by the DCI, and transmit a HARQ-NACK to the base station. The HARQ-NACK may include data indicating that the downlink transmission was used for energy harvesting, and may indicate, for example a charging rate or a requested charging rate. Based on receiving the HARQ-NACK, the base station may adjust one or more communication parameters (e.g., adjust an MCS in an effort to adjust the energy capable of being harvested by the UE). As a result, the base station does not unnecessarily alter some communication parameters in a manner which may degrade communications between the base station and the UE, and the base station may alter some communication parameters in a manner designed to support energy harvesting by the UE. In some situations, the communication parameters may be adjusted in a manner that enables the UE to both receive data and perform energy harvesting. In this way, wireless communications may be improved by reducing unnecessary changes to communication parameters that may result in a low quality link between a base station and UE, which may conserve network resources. In addition, a UE may be able to conserve power resources by indicating a need for energy harvesting and being provided with signals capable of powering the UE, charging a battery of the UE, and/or the like.

Figure 4:
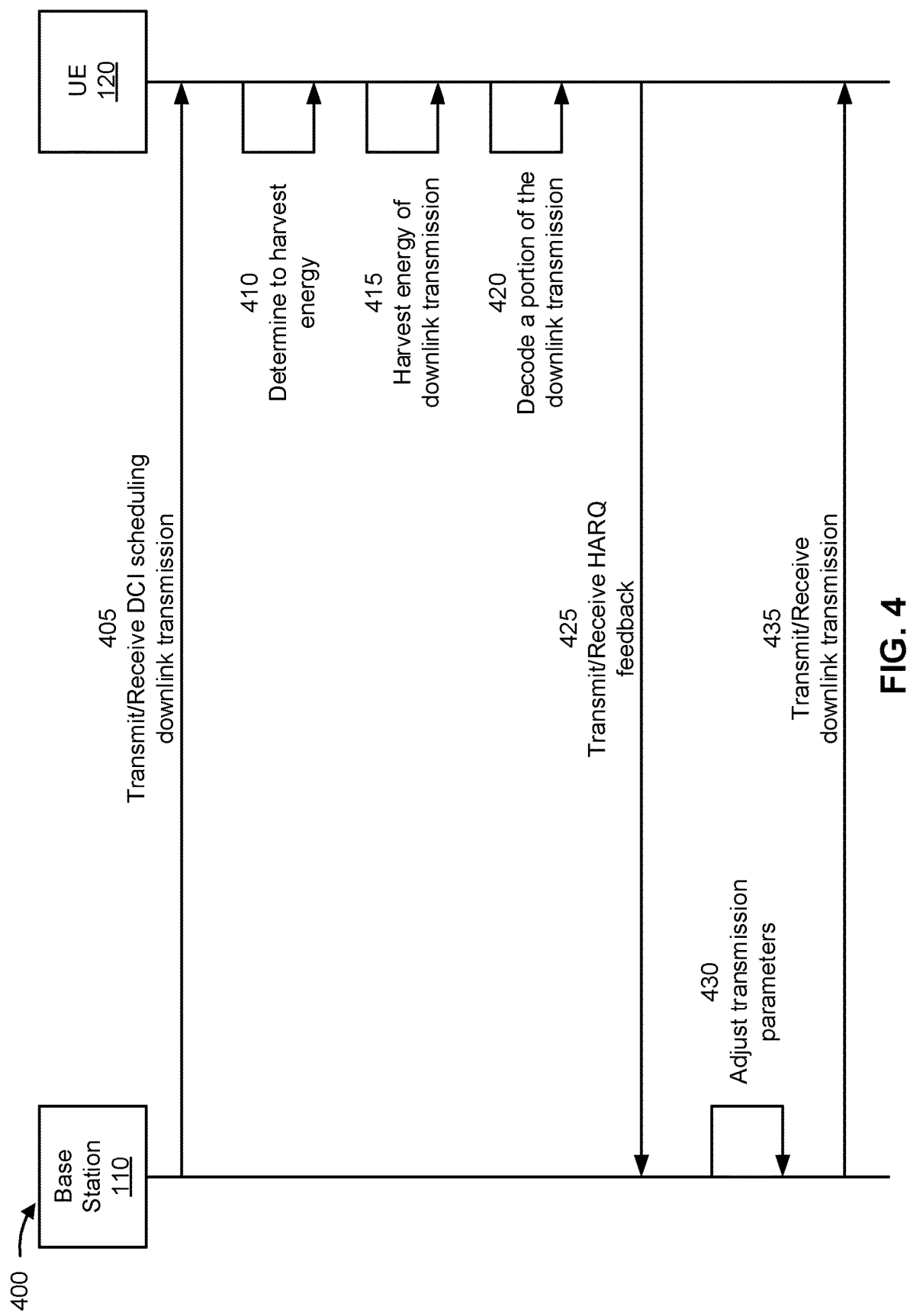
FIG. 4 is a diagram illustrating an example associated with energy harvesting reporting, in accordance with the present disclosure.

FIG. 4 is a diagram illustrating an example 400 associated with energy harvesting reporting, in accordance with the present disclosure. As shown in FIG. 4, a base station (e.g., base station 110) and a UE (e.g., UE 120) may communicate with one another.

As shown by reference number 405, the base station may transmit, and the UE may receive, DCI scheduling a downlink transmission. For example, the base station may transmit, and the UE may receive a physical downlink control channel (PDCCH) transmission, a physical downlink shared channel (PDSCH) transmission, and/or the like, which includes DCI scheduling another downlink transmission (e.g., PDCCH, PDSCH, and/or the like) to be transmitted to the UE.

As shown by reference number 410, the UE may determine to perform energy harvesting. In some aspects, prior to performing energy harvesting, the UE may determine that an energy level of the UE satisfies a threshold. Based at least in part on the threshold being satisfied, the UE may determine to perform energy harvesting on the downlink transmission. For example, the UE may have a low battery or may not have enough power to decode and/or transmit a response to the downlink transmission, among other examples. In this situation, the UE may determine that harvesting the energy of the downlink transmission is a higher priority than decoding and/or responding to the downlink transmission. The threshold may be preconfigured, for example, at a number between 0% and 100% of available power at the UE. While shown in example 400 as being determined after reception of the DCI, in some aspects, the UE may determine to perform energy harvesting of the downlink transmission prior to the DCI arriving at the UE.

As shown by reference number 415, the UE may perform energy harvesting using the downlink transmission. For example, the UE may harvest energy for all or a portion of the signal used to carry the downlink transmission, converting the harvested energy for the UE to use (e.g., to respond to the downlink transmission, to store, and/or the like).

In some aspects, the UE may perform the energy harvesting at a charging rate that is based at least in part on an amount of available power (e.g., available battery capacity, capacitor capacity, supercapacitor capacity, and/or the like) associated with the UE. In some aspects, the UE may perform energy harvesting at a particular charging rate by adjusting an amount of time that the UE is to harvest energy from the downlink transmission (e.g., in a time-switching architecture, as described herein) and/or adjusting a fraction of power allocated for energy harvesting (e.g., in a power-splitting architecture, as described herein). In some aspects, the charging rate may be associated with a proportion (e.g., a percentage) of signals being harvested, and data reception may be attempted on non-energy-harvested signals received by the UE, as described further herein. In some aspects, the charging rate may be a function (e.g., linear or non-linear) of stored energy, such that the charging rate increases as the stored energy decreases, and the charging rate decreases as the stored energy increases. In some aspects, the charging rate may be based at least in part on a priority associated with the downlink transmission. For example, ultra-reliable low latency communications (URLLC) may be higher priority communications than enhanced mobile broadband (eMBB) communications, which may lead to eMBB transmissions being harvested for energy more often, or at a higher charging rate, than URLLC transmissions. In some aspects the type and/or priority of the downlink transmission may be indicated by the DCI scheduling the downlink transmission.

As shown by reference number 420, in some aspects, the UE may decode a portion of the downlink transmission. For example, in some situations, the UE may perform energy harvesting on a first portion of the downlink transmission and attempt to decode a second portion of the downlink transmission. While using a portion of the downlink transmission for energy harvesting may lower the quality of the signal (e.g., increasing a level of interference, reducing redundancy of received data, and/or the like), the UE may still be able to decode the signal and obtain some or all of the information being transmitted in association with the DCI.

As shown by reference number 425, the UE may transmit, and the base station may receive, HARQ feedback indicating acknowledgment or negative-acknowledgment (e.g., ACK or NACK) of the downlink transmission. For example, the UE may transmit a HARQ-ACK or NACK based at least in part on using the downlink transmission for energy harvesting. In a situation where the UE used a first portion of the downlink transmission for energy harvesting and successfully decoded a second portion of the downlink transmission, as described herein, the UE may transmit a HARQ-ACK indicating that the UE successfully received the information associated with the DCI carried via the downlink transmission. In a situation where the UE did not successfully decode a second portion of the downlink transmission (e.g., either because the UE harvested the entire downlink transmission or was unable to decode an un-harvested portion of the downlink transmission), the UE may transmit a HARQ-NACK indicating that the UE did not successfully receive the information transmitted via the downlink transmission.

In some aspects, the HARQ feedback may include data indicating that the UE performed energy harvesting on the downlink transmission. In some aspects, the HARQ feedback may include data indicating the charging rate. For example, the charging rate indicated by the feedback may be an actual charging rate that the UE used when performing energy harvesting on the downlink transmission and/or a requested charging rate to be associated with future downlink transmissions that the UE will harvest for energy. By using the HARQ feedback to indicate that the downlink transmission was at least partially harvested for energy (and/or to indicate the charging rate), the UE may provide the base station with information that facilitates future communications with the UE, as described herein.

As shown by reference number 430, in some aspects the base station may adjust one or more transmission parameters, such as an MCS, associated with downlink transmission to the UE based at least in part on the HARQ feedback. In some aspects, the charging rate may be increased and/or decreased by changing an MCS of the signals transmitted to the UE. For example, increasing the MCS may reduce the power available to be obtained from the downlink transmission, while decreasing the MCS may increase the power available to be obtained from the downlink transmission. In some aspects, the base station may adjust the frequency at which downlink transmissions occur (e.g., to increase or decrease downlink transmissions that may be used by the UE for energy harvesting). In some aspects, the base station may adjust the transmission parameters to target a requested charging rate indicated by data included in the HARQ feedback. For example, the HARQ feedback may indicate that the UE would like to perform energy harvesting on 100% of the downlink signal, which may cause the base station to transmit the downlink transmission without information bits, or without any expectation that the downlink transmission will be decoded by the UE.

As shown by reference number 435, the base station may transmit, and the UE may receive, another downlink transmission. For example, the other downlink transmission may be transmitted based at least in part on the HARQ feedback. In some aspects, the base station may transmit the other downlink transmission using adjusted transmission parameters, as described herein, to enable the UE to perform energy harvesting on the other downlink transmission.

As indicated above, FIG. 4 is provided as an example. Other examples may differ from what is described with respect to FIG. 4.

Figure 5:
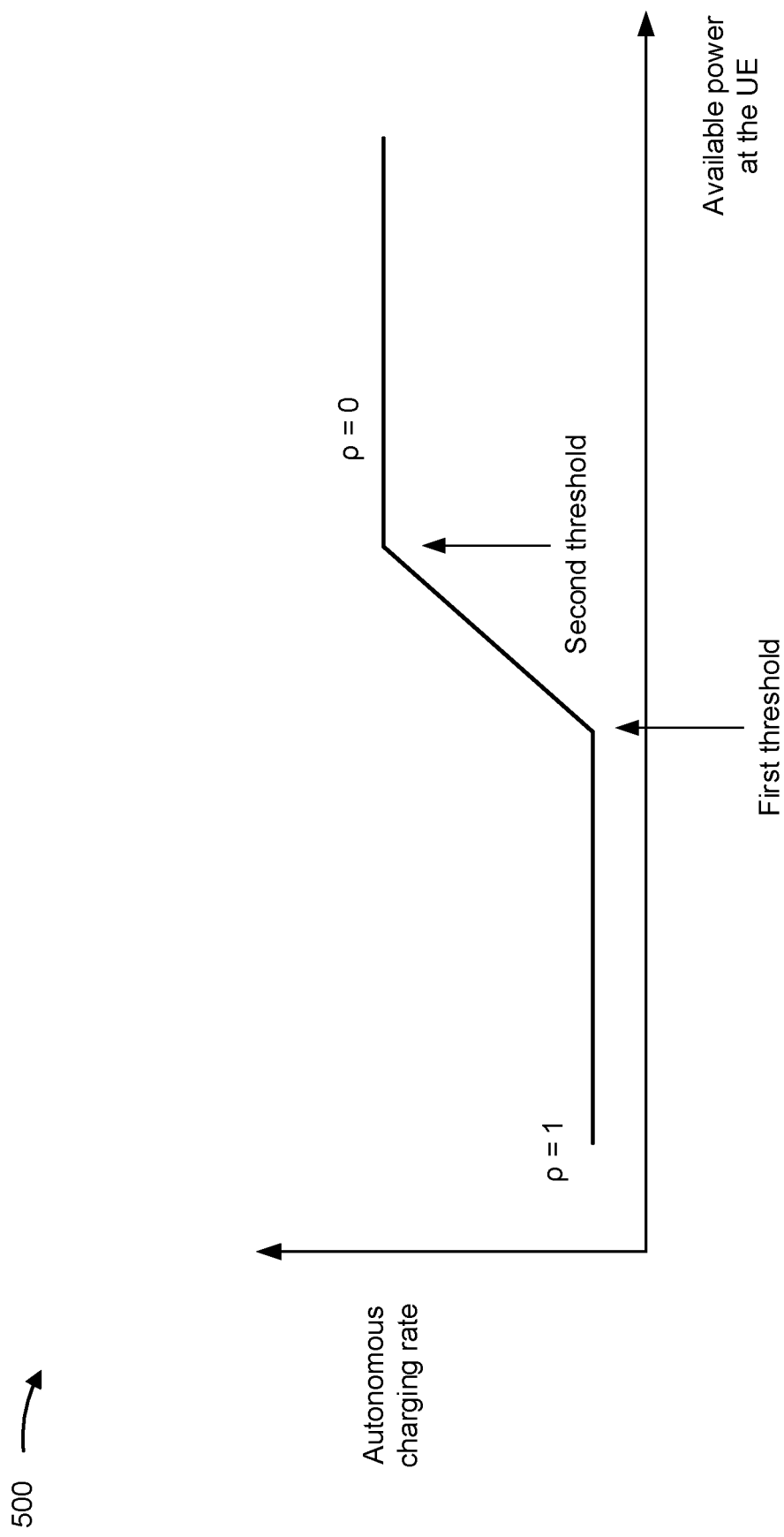
FIG. 5 is a diagram illustrating an example function of charging rate as a function of power available at a UE, in accordance with the present disclosure.

FIG. 5 is a diagram illustrating an example function 500 of charging rate as a function of power available at the UE, in accordance with the present disclosure. As shown in FIG. 5, the charging rate, p, is 1 while power available at the UE is below a first threshold, increases linearly after available power satisfies the first threshold, then is set to 0 after the available power satisfies a second threshold. While shown as a linear function between two thresholds, other functions or methods of determining the charging rate of energy harvesting may be used, including multiple functions, no thresholds, one threshold, or more than two thresholds, and different types of functions (e.g., non-linear functions). For example, the charging rate may be linearly flat and change in steps (e.g., ρ=1 between 0-25% power available, ρ=0.5 between 25-75% power available, ρ=0.25 between 50-75% power available, and ρ=0 between 75-100% power available). In some aspects, the method of determining the charging rate may be pre-configured or dynamically configured (e.g., by the base station).

As indicated above, FIG. 5 is provided as an example. Other examples may differ from what is described with respect to FIG. 5.

Figure 6:
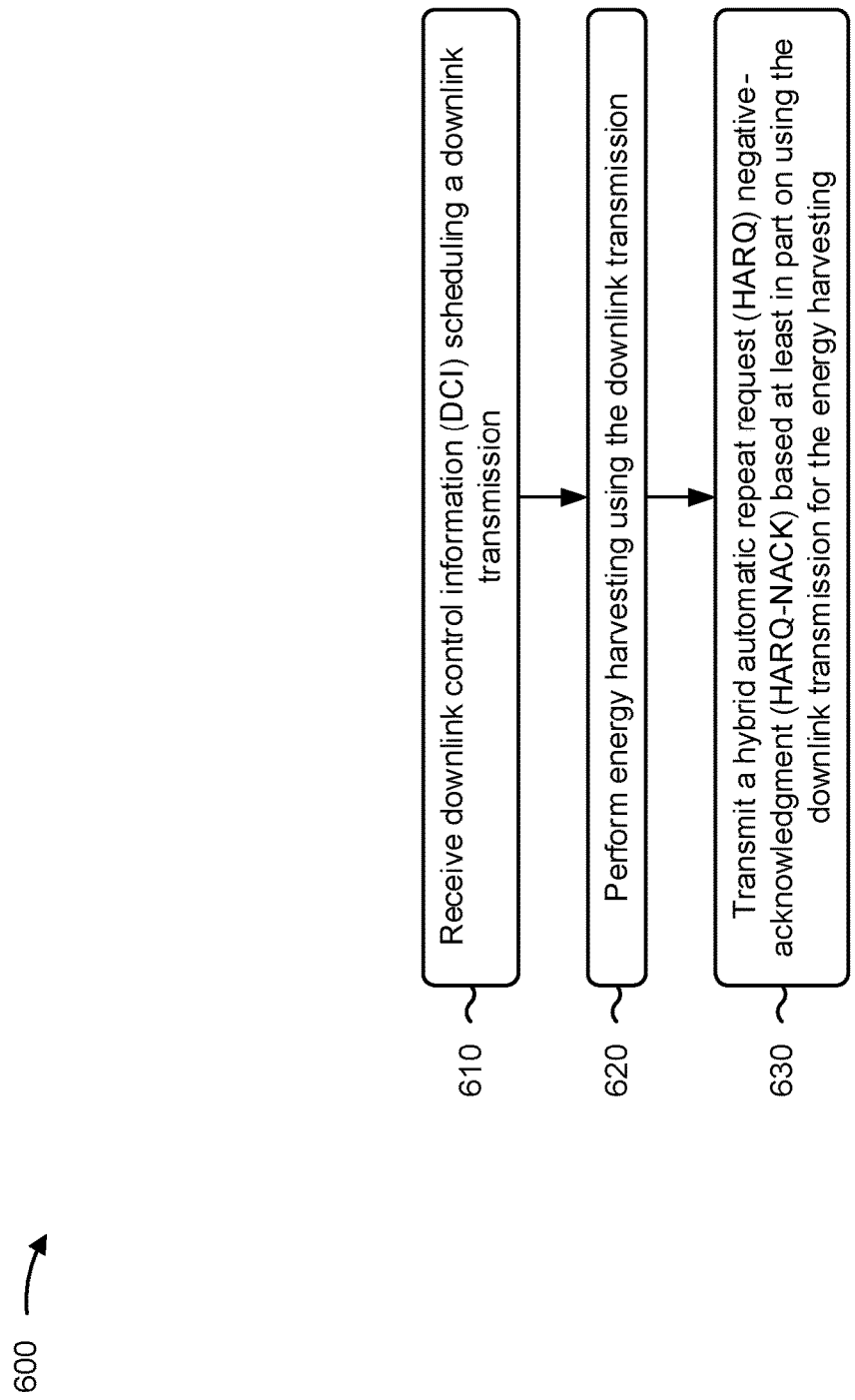
FIGS. 6 and 7 are diagrams illustrating example processes associated with energy harvesting reporting, in accordance with the present disclosure.

FIG. 6 is a diagram illustrating an example process 600 performed, for example, by a UE, in accordance with the present disclosure. Example process 600 is an example where the UE (e.g., UE 120) performs operations associated with energy harvesting reporting.

As shown in FIG. 6, in some aspects, process 600 may include receiving DCI scheduling a downlink transmission (block 610). For example, the UE (e.g., using communication manager 140 and/or reception component 802, depicted in FIG. 8) may receive DCI scheduling a downlink transmission, as described above.

As further shown in FIG. 6, in some aspects, process 600 may include performing energy harvesting using the downlink transmission (block 620). For example, the UE (e.g., using communication manager 140 and/or energy harvesting component 808, depicted in FIG. 8) may perform energy harvesting using the downlink transmission, as described above.

As further shown in FIG. 6, in some aspects, process 600 may include transmitting a HARQ-ACK based at least in part on using the downlink transmission for the energy harvesting (block 630). For example, the UE (e.g., using communication manager 140 and/or transmission component 804, depicted in FIG. 8) may transmit a HARQ-ACK based at least in part on using the downlink transmission for the energy harvesting, as described above.

Process 600 may include additional aspects, such as any single aspect or any combination of aspects described below and/or in connection with one or more other processes described elsewhere herein.

In a first aspect, process 600 includes determining, before performing the energy harvesting, that an energy level associated with the UE satisfies a threshold, and performing the energy harvesting is based at least in part on determining that the energy level associated with the UE satisfies the threshold.

In a second aspect, alone or in combination with the first aspect, performing the energy harvesting comprises performing the energy harvesting at a charging rate that is based at least in part on an amount of available power associated with the UE.

In a third aspect, alone or in combination with one or more of the first and second aspects, the charging rate indicates a proportion of the downlink transmission to be harvested.

In a fourth aspect, alone or in combination with one or more of the first through third aspects, the HARQ-NACK includes data indicating the charging rate.

In a fifth aspect, alone or in combination with one or more of the first through fourth aspects, the HARQ-NACK includes data indicating a requested charging rate.

In a sixth aspect, alone or in combination with one or more of the first through fifth aspects, the HARQ-NACK includes data indicating that the UE used the downlink transmission for the energy harvesting.

In a seventh aspect, alone or in combination with one or more of the first through sixth aspects, performing the energy harvesting comprises performing the energy harvesting on a first portion of the downlink transmission.

In an eighth aspect, alone or in combination with one or more of the first through seventh aspects, process 600 includes decoding a second portion of the downlink transmission.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
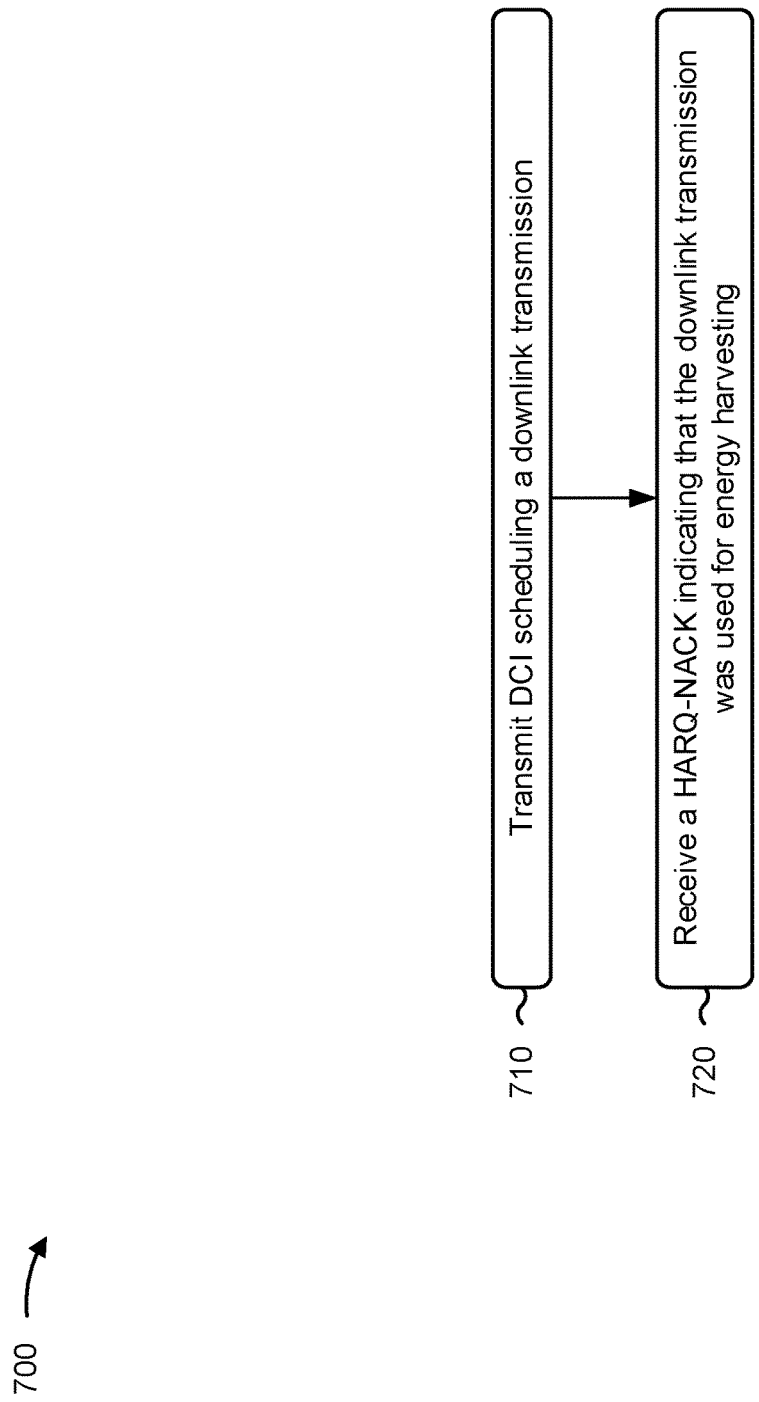

FIG. 7 is a diagram illustrating an example process 700 performed, for example, by a base station, in accordance with the present disclosure. Example process 700 is an example where the base station (e.g., base station 110) performs operations associated with energy harvesting reporting.

As shown in FIG. 7, in some aspects, process 700 may include transmitting DCI scheduling a downlink transmission (block 710). For example, the base station (e.g., using communication manager 150 and/or transmission component 904, depicted in FIG. 9) may transmit DCI scheduling a downlink transmission, as described above.

As further shown in FIG. 7, in some aspects, process 700 may include receiving a HARQ-ACK indicating that the downlink transmission was used for energy harvesting (block 720). For example, the base station (e.g., using communication manager 150 and/or reception component 902, depicted in FIG. 9) may receive a HARQ-ACK indicating that the downlink transmission was used for energy harvesting, as described above.

Process 700 may include additional aspects, such as any single aspect or any combination of aspects described below and/or in connection with one or more other processes described elsewhere herein.

In a first aspect, process 700 includes adjusting a modulation and coding scheme (MCS) associated with a subsequent downlink transmission based at least in part on receiving the HARQ-NACK indicating that the downlink transmission was used for energy harvesting.

In a second aspect, alone or in combination with the first aspect, the HARQ-NACK includes data indicating a charging rate associated with the energy harvesting.

In a third aspect, alone or in combination with one or more of the first and second aspects, the HARQ-NACK includes data indicating a requested charging rate.

In a fourth aspect, alone or in combination with one or more of the first through third aspects, process 700 includes adjusting an MCS associated with a subsequent downlink transmission based at least in part on the requested charging rate.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
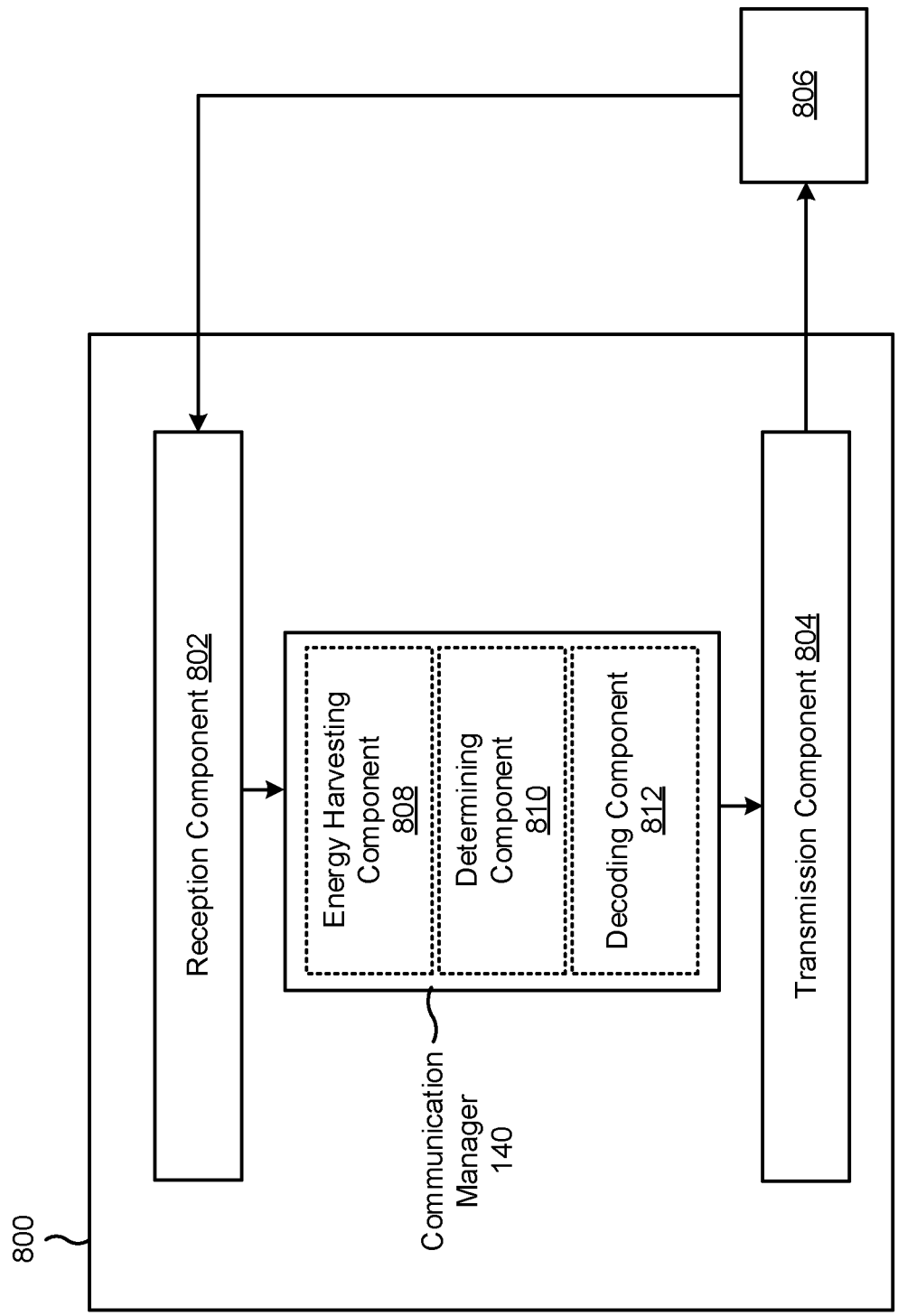
FIGS. 8 and 9 are diagrams of example apparatuses for wireless communication, in accordance with the present disclosure.

FIG. 8 is a diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 140. The communication manager 140 may include one or more of an energy harvesting component 808, a determining component 810, or a decoding component 812, among other examples.

In some aspects, the apparatus 800 may be configured to perform one or more operations described herein in connection with FIGS. 4-5. Additionally, or alternatively, the apparatus 800 may be configured to perform one or more processes described herein, such as process 600 of FIG. 6. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The reception component 802 may receive DCI scheduling a downlink transmission. The energy harvesting component 808 may perform energy harvesting using the downlink transmission. The transmission component 804 may transmit a HARQ-ACK based at least in part on using the downlink transmission for the energy harvesting.

The determination component 810 may determine, before performing the energy harvesting, that an energy level associated with the UE satisfies a threshold.

The decoding component 812 may decode a second portion of the downlink transmission.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
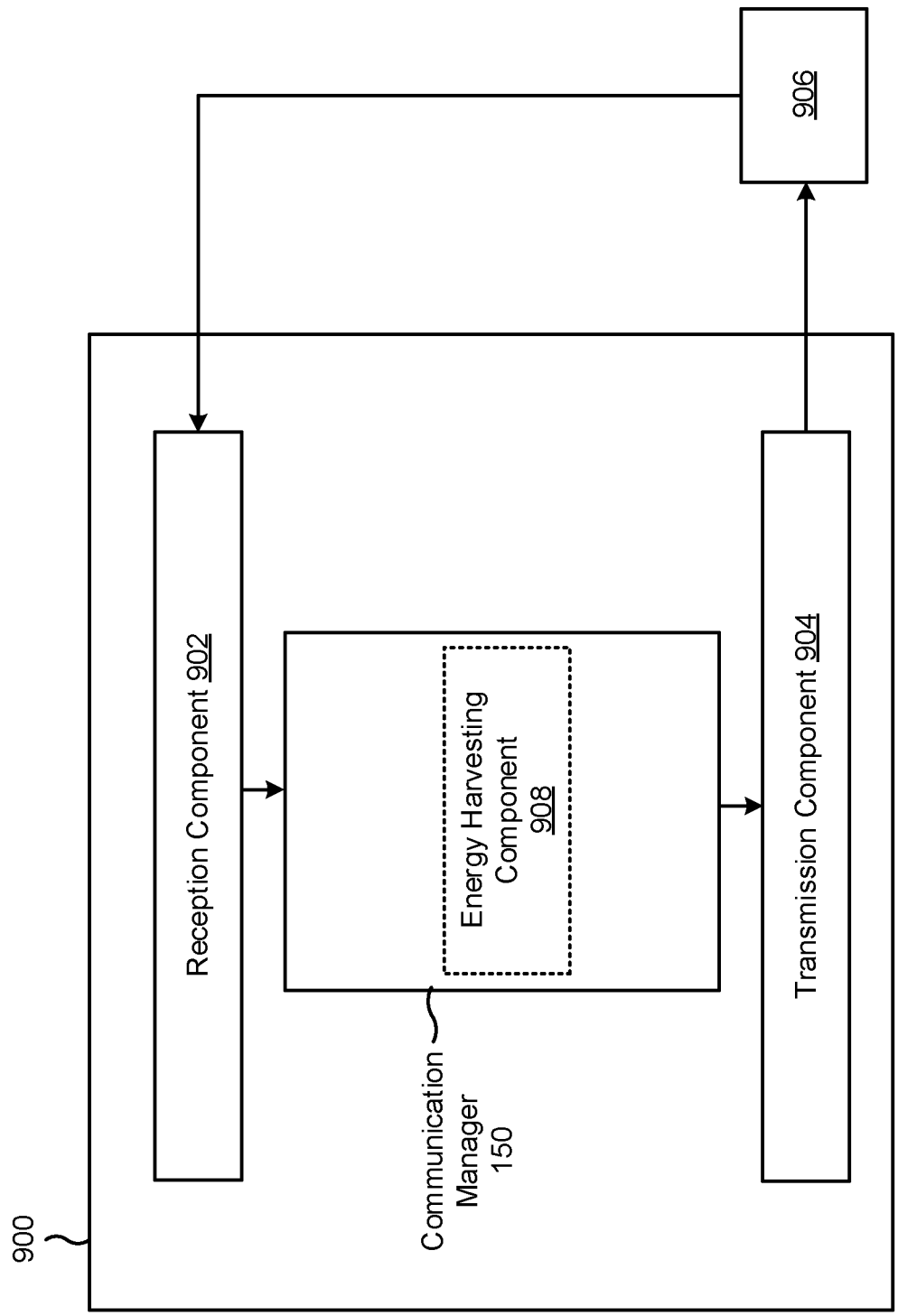

FIG. 9 is a diagram of an example apparatus 900 for wireless communication. The apparatus 900 may be a base station, or a base station may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 150. The communication manager 150 may include an energy harvesting component 908, among other examples.

In some aspects, the apparatus 900 may be configured to perform one or more operations described herein in connection with FIGS. 4-5. Additionally, or alternatively, the apparatus 900 may be configured to perform one or more processes described herein, such as process 700 of FIG. 7. In some aspects, the apparatus 900 and/or one or more components shown in FIG. 9 may include one or more components of the base station described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the base station described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the base station described in connection with FIG. 2. In some aspects, the transmission component 904 may be co-located with the reception component 902 in a transceiver.

The transmission component 904 may transmit DCI scheduling a downlink transmission. The reception component 902 may receive a HARQ-ACK indicating that the downlink transmission was used for energy harvesting.

The energy harvesting component 908 may adjust an MCS associated with a subsequent downlink transmission based at least in part on receiving the HARQ-NACK indicating that the downlink transmission was used for energy harvesting.

The energy harvesting component 908 may adjust an MCS associated with a subsequent downlink transmission based at least in part on the requested charging rate.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a UE, comprising: receiving DCI scheduling a downlink transmission; performing energy harvesting using the downlink transmission; and transmitting a HARQ-ACK based at least in part on using the downlink transmission for the energy harvesting.

Aspect 2: The method of Aspect 1, further comprising: determining, before performing the energy harvesting, that an energy level associated with the UE satisfies a threshold; and wherein performing the energy harvesting is based at least in part on determining that the energy level associated with the UE satisfies the threshold. wherein performing the energy harvesting is based at least in part on determining that the energy level associated with the UE satisfies the threshold.

Aspect 3: The method of any of Aspects 1-2, wherein performing the energy harvesting comprises: performing the energy harvesting at a charging rate that is based at least in part on an amount of available power associated with the UE.

Aspect 4: The method of Aspect 3, wherein the charging rate indicates a proportion of the downlink transmission to be harvested.

Aspect 5: The method of any of Aspects 3-4, wherein the HARQ-NACK includes data indicating the charging rate.

Aspect 6: The method of any of Aspects 1-5, wherein the HARQ-NACK includes data indicating a requested charging rate.

Aspect 7: The method of any of Aspects 1-6, wherein the HARQ-NACK includes data indicating that the UE used the downlink transmission for the energy harvesting.

Aspect 8: The method of any of Aspects 1-7, wherein performing the energy harvesting comprises: performing the energy harvesting on a first portion of the downlink transmission.

Aspect 9: The method of Aspect 8, further comprising: decoding a second portion of the downlink transmission.

Aspect 10: A method of wireless communication performed by a base station, comprising: transmitting DCI scheduling a downlink transmission; and receiving a HARQ-ACK indicating that the downlink transmission was used for energy harvesting.

Aspect 11: The method of Aspect 10, further comprising: adjusting a modulation and coding scheme (MCS) associated with a subsequent downlink transmission based at least in part on receiving the HARQ-NACK indicating that the downlink transmission was used for energy harvesting.

Aspect 12: The method of any of Aspects 10-11, wherein the HARQ-NACK includes data indicating a charging rate associated with the energy harvesting.

Aspect 13: The method of any of Aspects 10-12, wherein the HARQ-NACK includes data indicating a requested charging rate.

Aspect 14: The method of Aspect 13, further comprising: adjusting a modulation and coding scheme (MCS) associated with a subsequent downlink transmission based at least in part on the requested charging rate.

Aspect 15: An apparatus for wireless communication at a device, comprising a processor; memory coupled with the processor; and instructions stored in the memory and executable by the processor to cause the apparatus to perform the method of one or more of Aspects 1-9.

Aspect 16: An apparatus for wireless communication at a device, comprising a processor; memory coupled with the processor; and instructions stored in the memory and executable by the processor to cause the apparatus to perform the method of one or more of Aspects 10-14.

Aspect 17: A device for wireless communication, comprising a memory and one or more processors coupled to the memory, the one or more processors configured to perform the method of one or more of Aspects 1-9.

Aspect 18: A device for wireless communication, comprising a memory and one or more processors coupled to the memory, the one or more processors configured to perform the method of one or more of Aspects 10-14.

Aspect 19: An apparatus for wireless communication, comprising at least one means for performing the method of one or more of Aspects 1-9.

Aspect 20: An apparatus for wireless communication, comprising at least one means for performing the method of one or more of Aspects 10-14.

Aspect 21: A non-transitory computer-readable medium storing code for wireless communication, the code comprising instructions executable by a processor to perform the method of one or more of Aspects 1-9.

Aspect 22: A non-transitory computer-readable medium storing code for wireless communication, the code comprising instructions executable by a processor to perform the method of one or more of Aspects 10-14.

Aspect 23: A non-transitory computer-readable medium storing a set of instructions for wireless communication, the set of instructions comprising one or more instructions that, when executed by one or more processors of a device, cause the device to perform the method of one or more of Aspects 1-9.

Aspect 24: A non-transitory computer-readable medium storing a set of instructions for wireless communication, the set of instructions comprising one or more instructions that, when executed by one or more processors of a device, cause the device to perform the method of one or more of Aspects 10-14.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors, coupled to the one or more memories, configured to:
     receive, from a network entity, downlink control information (DCI) scheduling a downlink data transmission;
     receive the downlink data transmission;
     perform energy harvesting using the downlink data transmission; and
     transmit, to the network entity, a hybrid automatic repeat request (HARQ) feedback indicating that the UE used the downlink data transmission for the energy harvesting, wherein the HARQ feedback is based at least in part on using the downlink data transmission for the energy harvesting.

2. The UE of claim 1, wherein the one or more processors are further configured to:
   determine, before performing the energy harvesting, that an energy level associated with the UE satisfies a threshold; and
   wherein performing the energy harvesting is based at least in part on determining that the energy level associated with the UE satisfies the threshold.

3. The UE of claim 1, wherein the one or more processors, to perform the energy harvesting, are configured to:
   perform the energy harvesting at a charging rate that is based at least in part on an amount of available power associated with the UE.

4. The UE of claim 3, wherein the charging rate indicates a proportion of the downlink data transmission to be harvested.

5. The UE of claim 3, wherein the HARQ feedback includes data indicating the charging rate.

6. The UE of claim 1, wherein the HARQ feedback includes data indicating a requested charging rate.

7. The UE of claim 1, wherein the one or more processors, to perform the energy harvesting, are configured to:
perform the energy harvesting on a first portion of the downlink data transmission.

8. The UE of claim 7, wherein the one or more processors are further configured to:
decode a second portion of the downlink data transmission.

9. The UE of claim 1, wherein the one or more processors are configured to:
receive a second downlink data transmission; and
perform energy harvesting using the second downlink data transmission.

10. The UE of claim 9, wherein the second downlink data transmission corresponds to adjusted transmission parameters based at least in part on the HARQ feedback.

11. A method of wireless communication performed by a user equipment (UE), comprising:
receiving, from a network entity, downlink control information (DCI) scheduling a downlink data transmission;
receiving the downlink data transmission;
performing energy harvesting using the downlink data transmission; and
transmitting, to the network entity, a hybrid automatic repeat request (HARQ) feedback indicating that the UE used the downlink data transmission for the energy harvesting, wherein the HARQ feedback is based at least in part on using the downlink data transmission for the energy harvesting.

12. The method of claim 11, further comprising:
determining, before performing the energy harvesting, that an energy level associated with the UE satisfies a threshold; and
wherein performing the energy harvesting is based at least in part on determining that the energy level associated with the UE satisfies the threshold.

13. The method of claim 11, wherein performing the energy harvesting comprises:
performing the energy harvesting at a charging rate that is based at least in part on an amount of available power associated with the UE.

14. The method of claim 13, wherein the charging rate indicates a proportion of the downlink data transmission to be harvested.

15. The method of claim 13, wherein the HARQ feedback includes data indicating the charging rate.

16. The method of claim 11, wherein the HARQ feedback includes data indicating a requested charging rate.

17. The method of claim 11, wherein the HARQ feedback is a HARQ negative-acknowledgment (HARQ-NACK).

18. The method of claim 11, wherein performing the energy harvesting comprises:
performing the energy harvesting on a first portion of the downlink data transmission.

19. The method of claim 18, further comprising:
decoding a second portion of the downlink data transmission.

20. A non-transitory computer-readable medium storing a set of instructions for wireless communication, the set of instructions comprising:
one or more instructions that, when executed by one or more processors of a first user equipment (UE), cause the first UE to:
receive, from a network entity, downlink control information (DCI) scheduling a downlink data transmission;
receive the downlink data transmission;
perform energy harvesting using the downlink data transmission; and
transmit, to the network entity, a hybrid automatic repeat request (HARQ) feedback indicating that the UE used the downlink data transmission for the energy harvesting, wherein the HARQ feedback is based at least in part on using the downlink data transmission for the energy harvesting.

21. The non-transitory computer-readable medium of claim 20, wherein the one or more instructions are further executable to cause the UE to:
determine, before performing the energy harvesting, that an energy level associated with the UE satisfies a threshold; and
wherein performing the energy harvesting is based at least in part on determining that the energy level associated with the UE satisfies the threshold.

22. The non-transitory computer-readable medium of claim 20, wherein the one or more instructions, to cause the UE to perform energy harvesting, are further executable to cause the UE to:
perform the energy harvesting at a charging rate that is based at least in part on an amount of available power associated with the UE.

23. The non-transitory computer-readable medium of claim 22, wherein the charging rate indicates a proportion of the downlink data transmission to be harvested.

24. The non-transitory computer-readable medium of claim 22, wherein the HARQ feedback includes data indicating the charging rate.

25. The non-transitory computer-readable medium of claim 20, wherein the HARQ feedback includes data indicating a requested charging rate.

26. The non-transitory computer-readable medium of claim 20, wherein the one or more instructions, to cause the UE to perform energy harvesting, are further executable to cause the UE to:
perform the energy harvesting on a first portion of the downlink data transmission.

27. The non-transitory computer-readable medium of claim 20, wherein the one or more instructions are further executable to cause the UE to:
decode a second portion of the downlink data transmission.

28. An apparatus for wireless communication, comprising:
means for receiving, from a network entity, downlink control information (DCI) scheduling a downlink data transmission;
means for receiving the downlink data transmission;
means for performing energy harvesting using the downlink data transmission; and
means for transmitting, to the network entity, a hybrid automatic repeat request (HARQ) feedback indicating that the apparatus used the downlink data transmission for the energy harvesting, wherein the HARQ feedback is based at least in part on using the downlink data transmission for the energy harvesting.

29. The apparatus of claim 28, further comprising:
means for performing the energy harvesting at a charging rate that is based at least in part on an amount of available power associated with the apparatus.

30. The apparatus of claim 28, wherein the HARQ feedback includes data indicating a requested charging rate.

* * * * *